(12) United States Patent
Tani et al.

(10) Patent No.: US 6,557,949 B2
(45) Date of Patent: May 6, 2003

(54) VEHICLE BRAKE CONTROL DEVICE

(75) Inventors: Kazuhiko Tani, Saitama (JP); Wasaku Hosoda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/915,583

(22) Filed: Jul. 27, 2001

(65) Prior Publication Data

US 2002/0011386 A1 Jan. 31, 2002

(30) Foreign Application Priority Data

Jul. 27, 2000 (JP) .................................. 2000-231424

(51) Int. Cl.$^7$ .............................................. B60T 13/00
(52) U.S. Cl. ..................... 303/9.64; 303/137; 303/114.2
(58) Field of Search ............................. 303/9.64, 114.2, 303/137

(56) References Cited

U.S. PATENT DOCUMENTS

| | | | | |
|---|---|---|---|---|
| 4,494,800 A | * | 1/1985 | Hayashi | 188/344 |
| 5,219,211 A | * | 6/1993 | Tsuchida et al. | 303/6.01 |
| 5,372,408 A | * | 12/1994 | Tsuchida et al. | 303/9.61 |
| 5,501,511 A | * | 3/1996 | Wagner | 303/113.5 |
| 5,544,946 A | * | 8/1996 | Toyoda et al. | 188/106 P |
| 5,564,534 A | * | 10/1996 | Toyoda et al. | 188/106 P |
| 5,620,237 A | * | 4/1997 | Iwashita et al. | 188/106 P |
| 6,382,374 B1 | * | 5/2002 | Iwai et al. | 188/24.14 |
| 6,390,566 B1 | * | 5/2002 | Matsuno | 188/345 |
| 6,409,285 B1 | * | 6/2002 | Wakabayashi et al. | 303/137 |

FOREIGN PATENT DOCUMENTS

JP      10-175533      6/1998

\* cited by examiner

Primary Examiner—Christopher P. Schwartz
Assistant Examiner—Devon Kramer
(74) Attorney, Agent, or Firm—Birch, Stewart, Kolasch & Birch, LLP

(57) ABSTRACT

To prevent an operational feeling from deteriorating due to an operation of the other brake operating member under a superior braking condition caused by one brake operating member in a vehicle brake control device in which a pair of brake operating force transmission systems are connected to a single wheel brake, each of brake operating force reducing means capable of weakening the brake operating force transmitted to the wheel brake is arranged at both brake operating force transmission systems. When the brake operating force is transmitted only from one of the brake operating force transmission systems TB, TC to the wheel brake BF, the brake operating force reducing means installed at the other of the brake operating force transmission systems TB, TC operates to restrict the brake operating force transmission from the other brake operating force transmission system to the wheel brake BF under a state just before starting an operation of the brake operating force reducing means installed at one brake operating force transmission system.

14 Claims, 3 Drawing Sheets

VEHICLE BRAKE CONTROL DEVICE

BACKGROUND OF THE INVENTION

1. Field of the Invention

This invention relates to a vehicle brake control device in which a pair of brake operating force transmission systems are connected to a single wheel brake while enabling a brake operating force corresponding to an operating amount of a pair of brake operating members individually corresponding to these brake operating force transmission systems to be transmitted, and each of said both brake operating force transmission systems is provided with a brake operating force reducing means enabling the brake operating force transmitted to said wheel brake to be weakened for preventing the wheel corresponding to said wheel brake from being locked.

2. Description of Background Art

A brake control device is disclosed in Japanese Patent Laid-Open No. Hei 10-175533, for example.

Although such a brake control device causes a wheel brake installed at a front wheel, for example, to be operated even if any one of a pair of brake operating members is operated, it sometimes becomes a superior efficient braking state just before the brake operating force reducing means installed at one brake operating force transmission system starts its operation, i.e. just before it is determined that the wheel enters a locked state when the wheel brake is operated for brake only with the brake operating force transmittance of one brake operating force transmission system corresponding to the operation of one braking operating member. Under such a condition as above, if the brake operating force is inputted from the other brake operating force transmission system to the wheel brake in response to an operation of the other brake operating member, additional inputting of the brake operating force to the wheel brake is apt to cause the wheel to enter a locked state. Due to this fact, since the brake operating force reducing means installed at each of both brake operating force transmission system starts to operate to cause the brake force realized by the wheel brake to be weakened, a driver may feel a released state of effective brake or feel a vehicle body shock, resulting in that an operating feeling is sometimes deteriorated.

SUMMARY AND OBJECTS OF THE INVENTION

The present invention has been invented in view of the circumstances as described above and it is an object of the present invention to provide a vehicle brake control device for preventing the operating feeling from being deteriorated due to the fact that the other brake operating member is operated under a superior braking state caused by one brake operating member.

In order to accomplish the object described above, the present invention provides a vehicle brake control device in which a pair of brake operating force transmission systems are connected to a single wheel brake while enabling a brake operating force corresponding to an operating amount of a pair of brake operating members individually corresponding to these brake operating force transmission systems to be transmitted, each of brake operating force reducing means enabling the brake operating force transmitted to said wheel brake to be weakened in order to prevent a wheel corresponding to said wheel brake from entering a locked state is arranged with regard to both brake operating force transmission systems to provide a control unit for controlling an operation of both of the brake operating force reducing means in response to a result discriminating whether or not said wheel is in a locked state and an operating state of said brake operating force transmission systems, said control unit operates the brake operating force reducing means installed at the other of said both brake operating force transmission systems under a state just before starting an operation of the brake operating force reducing means installed at said one brake operating force transmission system when the brake operating force is transmitted only from one of both brake operating force transmission systems to said wheel brake so as to restrict the brake operating force transmission from the other brake operating force transmission system to the wheel brake.

With such an arrangement as above, when the brake operating force is transmitted from only one brake operating force transmittance system to the wheel brake by operating one brake operating member, the condition just before starting an operation of the brake operating force reducing means installed at one brake operating force transmittance system, i.e. an efficient braking condition just before determinating which of the wheel is entering a locked state causes the brake operating force transmittance from the other brake operating force transmittance system to the wheel brake to be restricted even if the other brake operating member is operated. Accordingly, the wheel is prevented from entering a locked state, the brake operating force reducing means installed at each of both brake operating force transmittance systems is prevented from entering a locked state, no operation is carried out to reduce the brake operating force, a vehicle driver may not feel a released brake effect or may not feel any vehicle body shock, thereby deterioration of the operating feeling can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the accompanying drawings, one preferred embodiment of the present invention shown there will be described as follows.

Figure 1:
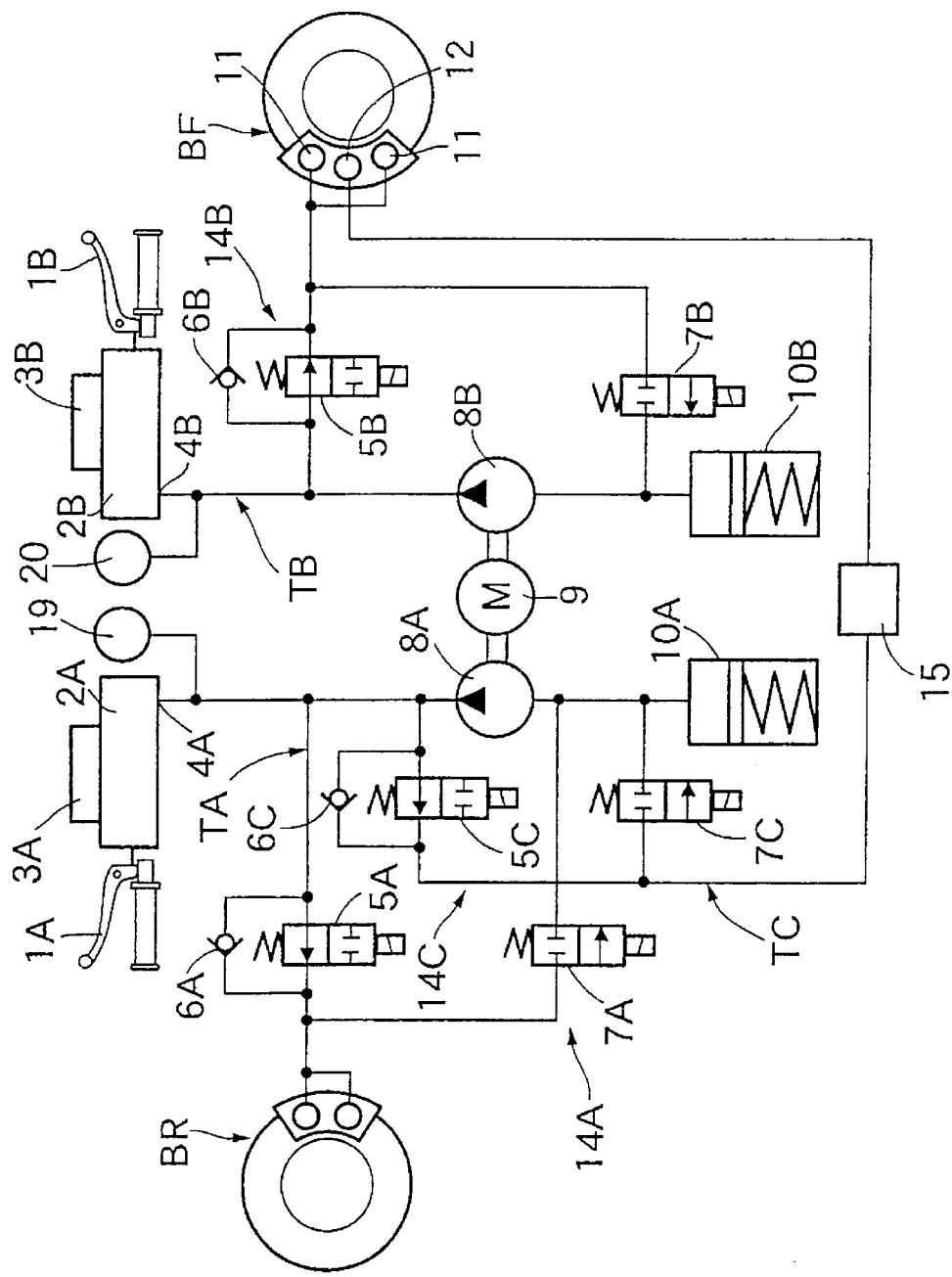
FIG. 1 is a liquid pressure circuit diagram for a motorcycle brake device.

At first, in FIG. 1, liquid pressure is outputted from an output port 4A of a master cylinder 2A provided with a reservoir 3A in response to an operation in which the motorcycle driver performs a brake operation of a left brake lever 1A by the driver's left hand, and further liquid pressure is outputted from an output port 4B of a master cylinder 2B provided with a reservoir 3B in response to an operation in which the rider performs a brake operation of a right brake lever 1B by the driver's right hand.

Brake liquid pressure outputted from the output port 4A of the master cylinder 2A in response to an operating force of the left brake lever 1A, i.e. brake liquid pressure corresponding to a brake operating force of the left brake lever 1A is transmitted to a rear wheel brake BR through a brake operating force transmission system TA composed of a conduit for guiding liquid pressure and further transmitted to the front wheel brake BF through a brake operating force transmission system TC composed of a conduit for guiding liquid pressure.

In this case, the front wheel brake BF includes a pair of ports 11, 11 and a port 12 arranged between these ports 11, 11, wherein the brake operating force transmission system TB is connected to both ports 11, 11 and the brake operating force transmission system TC is connected to the port 12.

That is, a pair of brake operating force transmission systems TB, TC enable a brake operating force corresponding to an operating amount of a pair of brake operating members 1B, 1A individually corresponding to these brake operating force transmission systems TB, TC to be transmitted and the systems TB, TC are connected to the single front wheel brake BF.

A brake operating force transmission system TA for transmitting a brake operating force to the rear wheel brake BR is provided with a brake operating force reducing means 14A enabling the brake operating force transmitted to the rear wheel brake BR for preventing the rear wheel from being locked to be weakened. The brake operating force reducing means 14A is comprised of a normal-opened solenoid valve 5A arranged between the output port 4A of the master cylinder 2A and the rear wheel brake BR; one-way valve 6A connected in parallel with the normally-opened solenoid valve 5A to allow brake liquid to flow from the rear wheel brake BR toward the master cylinder 2A; a reservoir 10A; a normally-closed solenoid valve 7A arranged between the rear wheel brake BR and the reservoir 10A; and a pump 8A capable of pumping out the brake liquid of the reservoir 10A and returning it to the master cylinder 2A.

Such a brake operating force reducing means 14A as above enables an antilock control for changing-over, in response to ON-OFF duty control of each of the solenoid valves 5A, 7A, a pressure increased state for communicating the master cylinder 2A with the rear wheel brake BR and shielding the rear wheel brake BR against the reservoir 10A, a liquid pressure holding state for shielding the master cylinder 2A against the rear wheel brake BR and shielding the rear wheel brake BR against the reservoir 10A, and a pressure reduced state for shielding the master cylinder 2A against the rear wheel brake BR and communicating the rear wheel brake BR with the reservoir 10A, resulting in that the brake force of the rear wheel brake BR is reduced under the pressure reduced state.

The brake operating force transmission system TB for use in transmitting the brake operating force to the front wheel brake BF is comprised of a brake operating force reducing means 14B enabling the brake operating force transmitted to the front wheel brake BF for preventing the front wheel from being locked. The brake operating force reducing means 14B includes a normally-opened solenoid valve 5B arranged between the output port 4B of the master cylinder 2B and the front wheel brake BF; one-way valve 6B connected in parallel with the normally-opened solenoid valve 5B enabling the brake liquid to flow from the front wheel brake BF to the master cylinder 2B; a reservoir 10B; a normally-closed solenoid valve 7B arranged between the front wheel brake BF and the reservoir 10B; and a pump 8B capable of pumping out the brake liquid in the reservoir 10B and returning it to the master cylinder 2B. This brake operating force reducing means can control and change over the brake pressure of the front wheel brake BF in three states of the increased pressure, holding the liquid pressure and reducing pressure in the same manner as that of the brake operating force reducing means 14A, resulting in that the brake force of the front wheel brake BF is reduced under the aforesaid pressure reduced state.

In addition, the brake operating force transmission system TC for transmitting the brake operating force to the front wheel brake BF includes a brake operating force reducing means 14C capable of weakening the brake operating force transmitted to the front wheel brake BF for preventing the front wheel from being locked. The brake operating force reducing means 14C includes a normally-opened solenoid valve 5C arranged between the output port 4A of the master cylinder 2A and the front wheel brake BF; one-way valve 6C connected in parallel with the normally-opened solenoid valve 5C enabling the brake liquid to flow from the front wheel brake BF to the master cylinder 2A; a reservoir 10A which is in common with the brake operating force reducing means 14A; a normal-closed solenoid valve 7C arranged between the front wheel brake BF and the reservoir 10B; and a pump 8A which is in common with the brake operating force reducing means 14A. This brake operating force reducing means can control and change over the brake pressure of the front wheel brake BF in three states of the increased pressure, holding the liquid pressure and reducing pressure in the same manner as that of the brake operating force reducing means 14B, resulting in that the brake force of the front wheel brake BF is reduced under the aforesaid pressure reduced state.

Further, a common electrical motor 9 is connected to both pumps 8A, 8B, and the electrical motor 9 continues to operate when an anti-lock control in which at least one of each of the brake operating force reducing means 14A, 14B and 14C is operated in response to the state in which either the front wheel or the rear wheel is apt to be locked.

In addition, in the brake operating force transmission system TC, a delay valve 15 is arranged between the normal-opened solenoid valve 5C of the brake operating force reducing means 14C and the front wheel brake BF. The delay valve 15 may act such that the liquid pressure outputted from the master cylinder 2A is transmitted through a brake operating force transmission system TA in response to a brake applying operation of a left brake lever 1A, thereby after the rear wheel brake BF starts to perform a brake applying operation, the liquid pressure from the master cylinder 2A is transmitted in delay to the front wheel brake BF through the brake operating force transmission system TC and the timing in which the front wheel brake BF starts to perform a brake applying operation is delayed.

Figure 2:
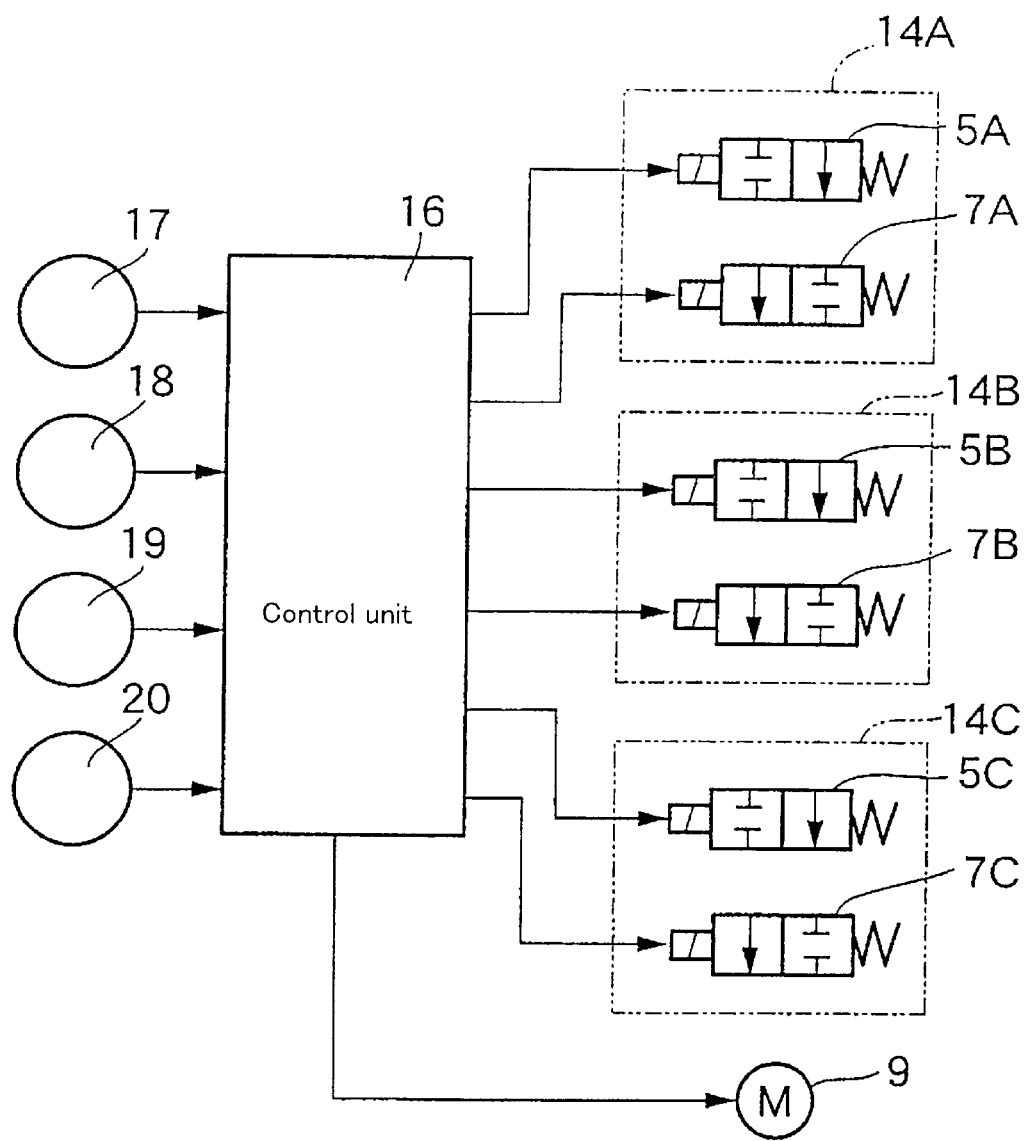
FIG. 2 is a block diagram for showing a configuration of a control system.

In FIG. 2, the normal-opened solenoid valves 5A to 5C and the normal-closed solenoid valves 7A to 7C in each of the brake operating force reducing means 14A to 14C, and the electrical motor 9 are controlled by the control unit 16.

To this control unit 16 are inputted a front wheel speed detected by a front wheel speed sensor 17, a rear wheel speed detected by a rear wheel speed sensor 18 and detected values of the liquid pressure sensors 19, 20 for sensing each of the output liquid pressures of the master cylinders 2A, 2B. Thus, the control unit 16 determines whether or not both front and rear wheels are apt to be locked in response to the speed detected by the front wheel and rear wheel speed sensors 17, 18, and then operations of the normally-opened solenoid valves 5A to 5C, the normally-closed solenoid valves 7A to 7C and the electrical motor 9 are controlled in response to the result of the determination.

In addition, the control unit 16 determines the operating state of the brake operating force transmission systems TB, TC in response to the detected values of the liquid pressure sensors 19, 20 and when it is determined that the brake operating force is transmitted to the front wheel brake BF only from one of the brake operating force transmission systems TB, TC (for example, TB) capable of transmitting the brake operating force to the front wheel brake BF, the brake operating force reducing means (for example, 14C) installed at the other of both brake operating force transmission systems (for example, TC) is operated such that the brake operating force transmission from the other brake operating force transmission system (for example, TC) to the front wheel brake BF is restricted.

In this case, it is satisfactory whether or not the brake operating force reducing means 14B is in a state just before starting operation is determined in response to a slip rate $\lambda$ of the front wheel, an acceleration $\omega$ of the front wheel and a vehicle body deceleration $\alpha$, and for example, when all the conditions of (1) the slip rate $\lambda$ is lower than (3 to 10%), (2) the acceleration $\omega$ of the front wheel is lower than (−1.5G), (3) the vehicle body deceleration $\alpha$ is more than (0.6 to 0.8G) are satisfied or one of the aforesaid conditions (1) to (3) is satisfied, it is satisfactory to determine that the reducing means is in the state just before determining that the front wheel is apt to be locked, i.e. either the brake operating force reducing means 14B or 14C is kept at the state just before starting an operation.

In the case where the brake operating force transmission to the front wheel brake BF is restricted by either the brake operating force reducing means 14C or 14B, it is satisfactory that either the normally-opened solenoid valve 5C or 5B installed at the brake operating force reducing means 14C or 14B is excited or the valve is closed and it is also satisfactory that transmission of the brake operating force is restricted under a chopping control in which opening or closing of the normally-opened solenoid valve 5C or 5B is repeated slightly.

Then, an action of the preferred embodiment will be described as follows, wherein when the brake operating force is being transmitted to the front wheel brake BF only from one of the brake operating force transmission systems TB, TC capable of transmitting the brake operating force to the front wheel brake BF, the control unit 16 operates the brake operating force reducing means provided at the other of both brake operating force transmission systems TB, TC to restrict transmission of the brake operating force from the other brake operating force transmission system to the front wheel brake BF. When the brake operating force is being transmitted only from the one brake operating force transmission system TB, for example, to the front wheel brake BF, the brake operating force reducing means 14C installed at the other brake operating force transmission system TC may operate to restrict the brake operating force transmission from the brake operating force transmission system TC to the front wheel brake BF under a state just before starting operation of the brake operating force reducing means 14B installed at the brake operating force transmission system TB.

Figure 3A:
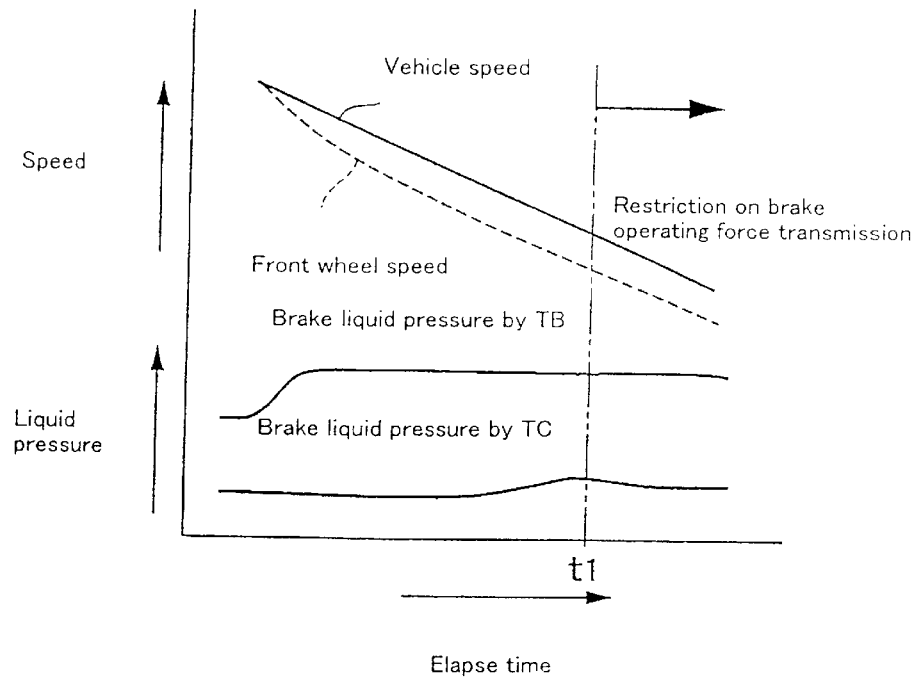
FIG. 3(a) is a diagram showing a variation in a vehicle speed, a front wheel speed and a front wheel brake liquid pressure according to the present invention.
Figure 3B:
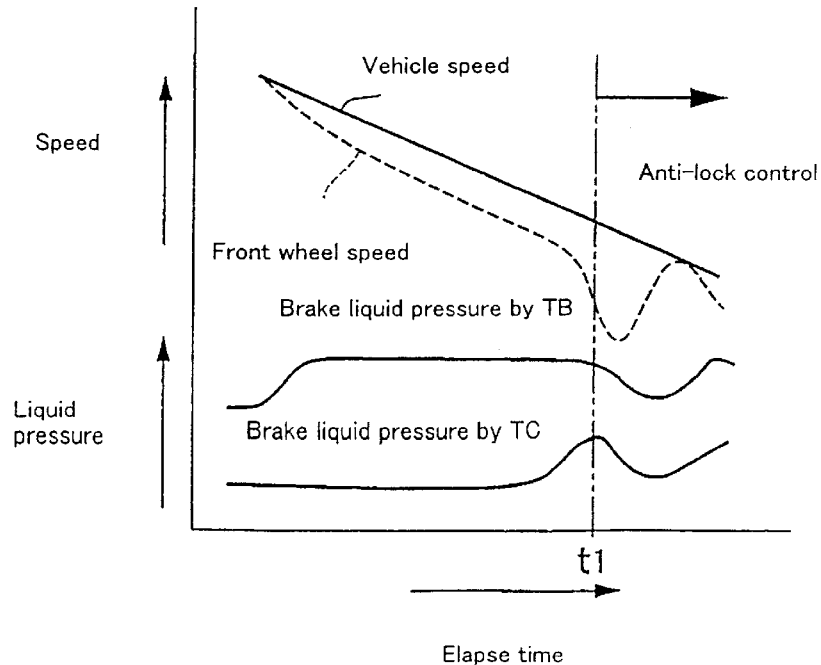
FIG. 3(b) is a diagram showing a variation in a vehicle speed, a front wheel speed and a front wheel brake liquid pressure according to the prior art.

With such an arrangement as above, as shown in FIG. 3(*a*), a brake liquid pressure acting as a brake operating force acts against the front wheel brake BF by the brake operating force transmission system TB in response to an operation of the right brake lever 1B, and even if the left brake lever 1A is operated at the time t1 where an efficient braking state just before determining that the front wheel is apt to be locked, the brake operating force reducing means 14C installed at the brake operating force transmission system TC restricts (shields in FIG. 3) transmission of the brake operating force (brake liquid pressure) for the front wheel brake BF. Due to this fact, there occurs no case that the brake force generated by the front wheel brake BF is increased to cause the front wheel to be locked, and further it is prevented that the driver feels a released feeling of the brake force, feels a vehicle body shock or a deterioration of a comfortable driving feeling.

To the contrary, as shown in FIG. 3(*b*), a brake liquid pressure acting as a brake operating force acts upon the front wheel brake BF by the brake operating force transmission system TB, the left brake lever 1A is operated at the time t1 under a state in which an efficient braking condition just before determining that the front wheel is apt to be locked is kept, and when the brake liquid pressure acting as the brake operating force from the brake operating force transmission system TC is transmitted to the front wheel brake BF by operating the left brake lever 1A, the brake force realized by the front wheel brake BF is increased, the front wheel is apt to be locked and the brake operating force reducing means 14B, 14C are anti-lock controlled to reduce the brake operating force, so that the driver feels the released feeling of the brake force, feels the vehicle body shock and deteriorates an operation feeling.

The foregoing has provided a description about the case in which the brake operating force generated by the brake operating force transmission system TC for transmitting the brake operating force in response to the operation of the left brake lever 1A is transmitted to the front wheel brake BF at the midway portion of the brake operating force transmission to the front wheel brake BF by the brake operating force transmission system TB for transmitting the brake operating force in response to an operation of the right brake lever 1B. In the case of opposition to the foregoing operation, i.e. a similar state may occur in the case that the brake operating force generated by the brake operating force transmission system TB for transmitting the brake operating force in response to the operation of the right brake lever 1B is transmitted to the front wheel brake BF at the midway part of the brake operating force transmission to the front wheel brake BF by the brake operating force transmission system TC for transmitting the brake operating force in response to an operation of the left brake lever 1A, and the transmission of the brake operating force to the front wheel brake BF is restricted by the brake operating force reducing means 14B installed at the brake operating force transmission system TB, thereby it is possible to prevent the driver from feeling a released feeling of brake effectiveness, feeling a vehicle body shock or a deterioration in the operation feeling.

Although the preferred embodiment of the present invention has been described above, the present invention is not restricted to the preferred embodiment described above, but various kinds of modification in design can be carried out without departing from the scope of the present invention described in the claim.

For example, although the motorcycle brake device in which both the front wheel brake BF and the rear wheel brake BR are operated to perform a brake action under an operation of the left brake lever 1A has been described in the preferred embodiment, the present invention can be applied to the motorcycle brake device in which the front wheel brake BF and the rear wheel brake BR are operated to perform a braking action even if any one of the pair of brake operating members is operated.

In addition, the present invention can also be applied to the vehicle brake device of a mechanical type in which each of the brake operating force transmission systems uses a brake cable and the like.

Further, although the preferred embodiment described above uses the liquid pressure sensors 19, 20 for use in detecting the operating state of the brake operating force transmission system, it may also be applicable that the operating state of the brake operating force transmission system is detected under application of a brake switch individually detecting each of the operations of a pair of brake operating members.

In accordance with the present invention as described above, it is possible to prevent the operation feeling from being deteriorated due to operation of the other brake operating member under a superior braking condition in which one of both brake operating members is performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle brake control device wherein a pair of brake operating force transmission systems are connected to a single wheel brake while enabling a brake operating force corresponding to an operating amount of a pair of brake operating members individually corresponding to the brake operating force transmission systems to be transmitted and brake operating force reducing means enabling the brake operating force transmitted to said wheel brake to be controlled in order to prevent a wheel from entering a locked state is arranged at said both brake operating force transmission systems comprising:

a control unit for controlling an operation of said brake operating force reducing means in response to an output responsive to the wheel being in a locked state and an operating state of said brake operating force transmission systems, said control unit operates the brake operating force reducing means installed at the other of said both brake operating force transmission systems under a state just before starting an operation of the brake operating force reducing means installed at said one brake operating force transmission system when the brake operating force is transmitted only from one of both brake operating force transmission systems to said wheel brake so as to restrict the brake operating force transmission from the other brake operating force transmission system to the wheel brake, wherein said brake operating force reducing means includes a first brake operating force reducer operatively connected to a first brake operating force transmission system and a second brake operating force reducer operatively connected to a second brake operating force transmission system.

2. The vehicle brake control device according to claim 1, wherein the pair of brake operating systems includes a first brake operating system and a second brake operating system, said first brake operating system includes two ports operatively mounted relative to the wheel brake for supplying a force to said wheel brake.

3. The vehicle brake control device according to claim 2, wherein said second brake operating system includes one port operatively mounted relative to the wheel brake for supplying a force to said wheel brake.

4. The vehicle brake control device according to claim 1, wherein said first brake operating force reducer includes a first normally-opened solenoid operatively positioned for normally transmitting a fluid from one of the brake operating members to the wheel brake, a one-way valve for selectively permitting the fluid to return to one of said brake operating members, a reservoir and a second normally-closed solenoid operatively positioned for stopping the flow of fluid from the wheel brake to the reservoir.

5. The vehicle brake control device according to claim 4, and further including a pump for returning fluid from the reservoir to one of the brake operating members.

6. The vehicle brake control device according to claim 1, wherein said second brake operating force reducer includes a first normally-opened solenoid operatively positioned for normally transmitting a fluid from one of the brake operating members to the wheel brake, a one-way valve for selectively permitting the fluid to return to one of said brake operating members, a reservoir and a second normally-closed solenoid operatively positioned for normally stopping the flow of fluid from the wheel brake to the reservoir and for selectively permitting the flow of fluid from the wheel brake to the reservoir to prevent wheel lock.

7. The vehicle brake control device according to claim 6, and further including a pump for returning fluid from the reservoir to one of the brake operating members.

8. A vehicle brake control device comprising:

a first brake operating force transmission system for supplying a first brake operating force to a wheel brake;

a second brake operating force transmission system for supplying a second brake operating force to the wheel brake;

brake operating force reducing means operatively connected to said first and second brake operating force transmission systems for enabling the first and second brake operating forces transmitted to said wheel brake to be controlled in order to prevent a wheel from entering a locked state;

a control unit for controlling an operation of said brake operating force reducing means in response to an output responsive to the wheel being in a locked state and an operating state of said first and second brake operating force transmission systems, said control unit operates the brake operating force reducing means installed at the first brake operating force transmission system under a state just before starting an operation of the brake operating force reducing means installed at said second brake operating force transmission system when the brake operating force is transmitted only from one of the first or second brake operating force transmission systems to said wheel brake so as to restrict the brake operating force transmission from the second brake operating force transmission system to the wheel brake, wherein said brake operating force reducing means includes a first brake operating force reducer operatively connected to a first brake operating force transmission system and a second brake operating force reducer operatively connected to a second brake operating force transmission system.

9. The vehicle brake control device according to claim 8, wherein the first brake operating system includes two ports operatively mounted relative to the wheel brake for supplying a force to said wheel brake.

10. The vehicle brake control device according to claim 9, wherein said second brake operating system includes one port operatively mounted relative to the wheel brake for supplying a force to said wheel brake.

11. The vehicle brake control device according to claim 8, wherein said first brake operating force reducer includes a first normally-opened solenoid operatively positioned for normally transmitting a fluid from a first brake operating member to the wheel brake, a one-way valve for selectively permitting the fluid to return to one of said brake operating members, a reservoir and a second normally-closed solenoid operatively positioned for stopping the flow of fluid from the wheel brake to the reservoir.

12. The vehicle brake control device according to claim 11, and further including a pump for returning fluid from the reservoir to one of the brake operating members.

13. The vehicle brake control device according to claim 8, wherein said second brake operating force reducer includes a first normally-opened solenoid operatively positioned for normally transmitting a fluid from the second brake operating member to the wheel brake, a one-way valve for selectively permitting the fluid to return to one of said brake operating members, a reservoir and a second normally-closed solenoid operatively positioned for normally stopping the flow of fluid from the wheel brake to the reservoir and for selectively permitting the flow of fluid from the wheel brake to the reservoir to prevent wheel lock.

14. The vehicle brake control device according to claim 13, and further including a pump for returning fluid from the reservoir to one of the brake operating members.

\* \* \* \* \*